United States Patent
Bouchard et al.

(10) Patent No.: US 9,542,654 B2
(45) Date of Patent: Jan. 10, 2017

(54) OVERLAPPING TRACE NORMS FOR MULTI-VIEW LEARNING

(71) Applicant: Xerox Corporation, Norwalk, CT (US)

(72) Inventors: Guillaume Bouchard, Saint-Martin-le Vinoux (FR); Cedric Philippe Charles Jean Ghislain Archambeau, Berlin (DE); Behrouz Behmardi, San Jose, CA (US)

(73) Assignee: XEROX CORPORATION, Norwalk, CT (US)

( * ) Notice: Subject to any disclaimer, the term of this patent is extended or adjusted under 35 U.S.C. 154(b) by 363 days.

(21) Appl. No.: 14/339,994

(22) Filed: Jul. 24, 2014

(65) Prior Publication Data

US 2016/0026925 A1    Jan. 28, 2016

(51) Int. Cl.
*G06N 99/00*    (2010.01)
*G06F 17/30*    (2006.01)

(52) U.S. Cl.
CPC ............ *G06N 99/005* (2013.01); *G06F 17/30* (2013.01)

(58) Field of Classification Search
None
See application file for complete search history.

(56) References Cited

U.S. PATENT DOCUMENTS

| 2006/0034495 | A1* | 2/2006 | Miller | G06K 9/00214 382/118 |
| 2011/0119210 | A1* | 5/2011 | Zhang | G06N 99/005 706/12 |
| 2012/0331025 | A1* | 12/2012 | Gemulla | G06F 15/781 708/200 |

(Continued)

OTHER PUBLICATIONS

Amini, et al., "Learning from multiple partially observed views—an application to multilingual text categorization". In NIPS, (2010).

(Continued)

*Primary Examiner* — Stanley K Hill
*Assistant Examiner* — Mikayla Chubb
(74) *Attorney, Agent, or Firm* — Fay Sharpe LLP

(57) ABSTRACT

In multi-view learning, optimized prediction matrices are determined for V≥2 views of n objects, and a prediction of a view of an object is generated based on the optimized prediction matrix for that view. An objective $\min_{\mathcal{P}} f(\mathcal{P})$ is optimized, wherein $\mathcal{P}$ is a set of parameters including at least the V prediction matrices and a concatenated matrix comprising a concatenation of the prediction matrices, and $f(\mathcal{P})$ comprises a sum including at least a loss function for each view, a trace norm of the prediction matrix for each view, and a trace norm of the concatenated matrix. $\mathcal{P}$ may further include a sparse matrix for each view, with $f(\mathcal{P})$ further including an element-wise $\ell_1$ norm of the sparse matrix for each view. $\mathcal{P}$ may further include regularization parameters scaling the trace norms of the prediction matrices and the trace norm of the concatenated matrix.

20 Claims, 2 Drawing Sheets

(56) References Cited

U.S. PATENT DOCUMENTS

| | | | | |
|---|---|---|---|---|
| 2014/0114889 | A1* | 4/2014 | Dagum | G06F 19/3406 706/12 |
| 2014/0156579 | A1* | 6/2014 | Bouchard | G06F 17/16 706/46 |
| 2014/0180760 | A1* | 6/2014 | Karatzoglou | G06Q 30/0201 705/7.29 |
| 2015/0052090 | A1* | 2/2015 | Lin | G06N 7/005 706/12 |
| 2015/0161441 | A1* | 6/2015 | Robinson | G06K 9/00791 382/113 |
| 2016/0140425 | A1* | 5/2016 | Kulkarni | G06K 9/4628 382/159 |

OTHER PUBLICATIONS

Bach, et al., "Kernel independent component analysis," Journal of Machine Learning Re-search, 3: pp. 1-48 (2002).

Bach, et al., "A Probabilistic Interpretation of Canonical Correlation Analysis," Technical Report 688, Dept. of Statistics, University of California, Berkley, pp. 1-9 (Apr. 21, 2005).

Bertsekas, "Constrained optimization and lagrange multiplier methods," Computer Science and Applied Mathematics, Boston Academic Press, pp. 95-157(1982).

Borga, "Learning Multidimensional Signal Processing," Linkoping Studies in Science and Technology Dissertations, No. 531, Dept. of Electrical Engineering, Linkoping University, S-581 83 Linkoping, Sweden, pp. 1-181 (1998).

Boyd, et al., "Distributed Optimization and Statistical Learning via the Alternating Direction Method of Multipliers," Foundations and Trends in Machine Learning, vol. 3, No. 1 pp. 1-122 (2010).

Cai, et al., "A Singular Value Thresholding Algorithm for Matrix Completion," Applied and Computational Mathematics, pp. 1-25 (Oct. 2008).

Candes, et al., "Exact Matrix Completion via Convex Optimization," Foundations of Computational Mathematics, 9: pp. 717-772 (2009).

Candes, et al., "Robust Principal component Analysis?" Journal of the ACM, 58(3), pp. 1-56 (Feb. 2014).

Cannon, et al., "Robust nonlinear canonical correlation analysis," Non-linear Processes in Geophysics, 15, pp. 221-232 (2008).

Goldberg, et al., "Transduction with matrix completion: Three birds with one stone," in NIPS, pp. 1-7 (2010).

Hardoon, et al., "Canonical correlation analysis; An overview with application to learning methods," Neural Computation 16(12): pp. 2639-2664 (2004).

Hotelling, "Relations between two sets of variates," Biometrika, 28 (3/4): pp. 321-377 (1936).

Jia, et al., "Factorized Latent Spaces with Structured Sparsity," NIPS, pp. 1-7 (2010).

Jolliffe, et al., "Principal Component Analysis," Second Edition, Springer-Verlag, pp. 1-4 (1986).

Lin, et al., "The augmented lagrange multiplier method for exact recovery of corrupted low-rank matrices," Technical Report, UIUC, pp. 1-18 (2009).

Salakhutdinov, et al., "Probabilistic Matrix Factorization," NIPS, pp. 1-6 (2008).

Sturm, "Using sedumi 1.02, a matlab toolbox for optimization over symmetric cones," Optimization methods and software, vol. 11 (1-4), pp. 625-653 (1999).

Tipping, et al., "Probabilistic principal component analysis," Journal of the Royal Statistical Society: Series B, vol. 61, No. 3, pp. 611-622 (1999).

Toh, et al., "An accelerated proximal gradient algorithm for nuclear norm regularized linear least squares problems," Pacific Journal of Optimization (6), pp. 615-640 (2010).

Virtanen, "Bayesian CCA via Group Sparsity," ICML, pp. 1-6 (2011).

White, et al., "Convex Multi-view Subspace Learning," NIPS, pp. 1-12 (2012).

* cited by examiner

OVERLAPPING TRACE NORMS FOR MULTI-VIEW LEARNING

BACKGROUND

The following relates to the machine learning arts and to applications of same such as multi-label classification, image denoising, and so forth.

In multi-view learning, an object can be described by two or more different feature sets. Each feature set corresponds to a "view" of the object.

By way of illustrative example, the object may be an electronic document, which may be described by a first feature set (first view) comprising a bag-of-words vector representing textual content of the document, and by a second feature set (second view) representing the document structure (its organization into books, sections, chapters, or so forth), and perhaps by a third feature set (third view) representing the images contained in the (illustrative multimedia) document, and so forth.

As another illustrative example, an object may be a three-dimensional human face, and the first view of the face may be a feature set describing a photograph of the face obtained for a certain pose and lighting condition, a second view of the face may be a feature set describing a photograph of the face obtained for a different pose and/or different lighting condition, and so forth.

As another illustrative example, an object may be an digitally recorded audio clip, and a first view may represent the digital recording characteristics (such as bit rate, sampling rate, or so forth) while a second view may represent audio characteristics (such as frequency spectrum, dynamic range, or so forth), while a third view may represent metadata associated with the audio clip (such as a title or filename, create date, and so forth).

As another illustrative example, an object may be the psychological profile of a person, and a first view may be results of a personality test, a second view may be results of a gambling addiction test, a third view may be results of a schizophrenia screening test, and so forth.

In a multi-view learning task, V views of a set of n objects can be represented in general fashion as a set of prediction matrices $\{X_k\}_{k=1}^{V}$ for the V views, where in general the prediction matrix $X_k$ has a dimension n corresponding to the n objects and another dimension $d_k$ corresponding to the number of features characterizing the $k^{th}$ view. Observations of the various views of objects obtained by experiments, tests, recording data available on certain objects, or by other means can similarly be represented in general as a set of incomplete observation matrices $\{Y_k\}_{k=1}^{V}$ where the observation matrix $Y_k$ analogously has a dimension n corresponding to the n objects and another dimension $d_k$ corresponding to the number of features characterizing the $k^{th}$ view. The observation matrices $Y_k$ are generally incomplete in that only a small sub-set of the n objects are actually observed, and/or not all views (or not all features of a given view) of an observed object may be available. By way of illustrative example, in the illustrative human face learning task, photographs of a given face may be available for only some poses, and/or for only some lighting conditions, and it may be desired to predict the features of one of the unavailable photographs of the face.

Disclosed herein are improved multi-view learning techniques that provide various advantages as disclosed herein.

BRIEF DESCRIPTION

In some embodiments disclosed herein, a non-transitory storage medium stores instructions readable and executable by a computer to perform a method for generating predictions by operations including: determining optimized prediction matrices $\{X_k\}_{k=1}^{V}$ for multi-view learning of V views where $V \geq 2$ by optimizing an objective $\min_{\mathcal{P}} f(\mathcal{P})$ wherein $\mathcal{P}$ is a set of parameters including at least the prediction matrices $X_1, \ldots, X_V$ and a matrix $X_0$ comprising a concatenation of the prediction matrices $X_1, \ldots, X_V$, and function $f(\mathcal{P})$ comprises a sum including at least $\lambda_0 \|X_0\|_* + \Sigma_{k=1}^{V} \lambda_k \|X_k\|_* + \Sigma_{k=1}^{V} E_k(X_k = P_k X_0; Y_k)$ where $\{Y_k\}_{k=1}^{V}$ are incomplete observation matrices for the V views, $P_k X_0$ denotes the sub-matrix of $X_0$ corresponding to prediction matrix $X_k$, $E_k$ is a cumulative loss summed over the observations of the observation matrix $Y_k$, $\|\cdot\|_*$ denotes the trace norm, and $\{\lambda_k\}_{k=0}^{V}$ are regularization parameters; and generating a prediction for view k of an object based on the optimized prediction matrix $X_k$. In some embodiments the set of parameters $\mathcal{P}$ further includes regularization parameters $\{\lambda_k\}_{k=0}^{V}$. In some such embodiments the optimizing of the objective $\min_{\mathcal{P}} f(\mathcal{P})$ comprises tuning the regularization parameters $\{\lambda_k\}_{k=0}^{V}$ using a grid optimization. In some embodiments the set of parameters $\mathcal{P}$ further includes sparse matrices $\{S_k\}_{k=1}^{V}$ and the function $f(\mathcal{P})$ comprises a sum including at least $\lambda_0 \|X_0\|_* + \Sigma_{k=1}^{V} \lambda_k \|X_k\|_* + \Sigma_{k=1}^{V} \alpha_k \|S_k\|_{1,1} + \Sigma_{k=1}^{V} E_k(X_k + P_k X_0; Y_k)$ where $\|\cdot\|_{1,1}$ denotes the element-wise $\ell_1$ penalty and $\{\alpha_k\}_{k=0}^{V}$ are regularization parameters. In some embodiments the determining comprises optimizing the objective $\min_{\mathcal{P}} f(\mathcal{P})$ using Alternating Direction Method of Multipliers (ADMM). In some embodiments the determining comprises optimizing the objective $\min_{\mathcal{P}} f(\mathcal{P})$ using an Augmented Lagrangian method in which the Lagrangian function is augmented by a quadratic penalty.

In some embodiments, an apparatus comprises the non-transitory storage medium of the immediately preceding paragraph, and a computer configured to read and execute instructions stored on the non-transitory storage medium to generate a prediction for a view k of an object i.

In some embodiments disclosed herein, a method comprises determining optimized prediction matrices for multi-view learning of V views where $V \geq 2$, and generating a prediction of a view of an object based on the optimized prediction matrix for that view. The optimized prediction matrices are determined by optimizing an objective $\min_{\mathcal{P}} f(\mathcal{P})$ wherein $\mathcal{P}$ is a set of parameters including at least the prediction matrices for the V views and for a set of objects and an aggregation of the prediction matrices for the V views, and function $f(\mathcal{P})$ comprises a sum including at least (1) a loss function for each view comparing the prediction matrix for the view with an incomplete observation matrix for the view and (2) a penalty function for each view computed based on the prediction matrix for the view and (3) a penalty function computed based on the aggregation of the prediction matrices for the V views. The determining and generating operations are suitably performed by an electronic data processing device. In some embodiments the objective $\min_{\mathcal{P}} f(\mathcal{P})$ is optimized using an Augmented Lagrangian method in which the Lagrangian function is augmented by a quadratic penalty.

In some embodiments disclosed herein, an electronic data processing device is configured to perform a method including determining optimized prediction matrices for V views of n objects where $V \geq 2$, and generating a prediction of a view of an object based on the optimized prediction matrix for that view. The optimized prediction matrices are determined by optimizing an objective $\min_{\mathcal{P}} f(\mathcal{P})$ wherein $\mathcal{P}$ is a set of parameters including at least the prediction matrices for the V views and a concatenated matrix comprising a concatenation of the prediction matrices for the V views, and function $f(\mathcal{P})$ comprises a sum including at least (1) a loss function for each view comparing the prediction matrix for the view with an incomplete observation matrix for the view and (2) a trace norm of the prediction matrix for each view and (3) a trace norm of the concatenated matrix. In some embodiments the set of parameters $\mathcal{P}$ further includes a sparse matrix for each view and the function $f(\mathcal{P})$ comprises said sum further including (4) an element-wise $\ell_1$ norm of the sparse matrix for each view. In some embodiments the set of parameters $\mathcal{P}$ further includes regularization parameters scaling the trace norms of the prediction matrices for the V views and a regularization parameter scaling the trace norm of the concatenated matrix. In some embodiments the objective $\min_{\mathcal{P}} f(\mathcal{P})$ is optimized using an Augmented Lagrangian method in which the Lagrangian function is augmented by a quadratic penalty.

DETAILED DESCRIPTION

The disclosed multi-view learning approaches comprise convex formulations of multi-view completion. The following notation is employed. Let $\{(y_{1i}, y_{2i}): y_{1i} \in \mathbb{R}^{d_1}, y_{2i} \in \mathbb{R}^{d_2}\}_{i=1}^n$ be observed co-occurring data pairs corresponding to two views of an object. The number of features in View 1 ($y_{1i}$) and View 2 ($y_{2i}$) are respectively denoted by $d_1$ and $d_2$. The main reason for defining two vectors of observations rather than a single concatenated vector in the product space $\mathbb{R}^{d_1+d_2}$ is that the nature of the data in each view might be different. For example, in a multi-lingual text application, the views suitably represent the features associated with two distinct languages. Another example is image labeling, where the first view may suitably correspond to the image signature features and the second view may suitably encode the image labels. In the illustrative examples presented herein, two-view problems are addressed, but the extension to an arbitrary number of views is straightforward.

In a suitable formulation, the observations $\{y_{1i}\}_{i=1}^n$ and $\{y_{2i}\}_{i=1}^n$ are stacked respectively into the matrices $Y_1 := \{y_{1ij}\} \in \mathbb{R}^{d_1 \times n}$ and $Y_2 := \{y_{2ij}\} \in \mathbb{R}^{d_2 \times n}$. In the illustrative notation, the rows of the matrix correspond to features and the columns correspond to objects; however, it is straightforward to employ transpositions of this formulation. In predictive tasks, the goal is to predict missing elements in the observation matrices $Y_1$ and $Y_2$. Multi-view learning leverages the likelihood that the dependencies between the views provide useful information for predicting the missing entries in one view given the observed entries in both views.

Figure 1:
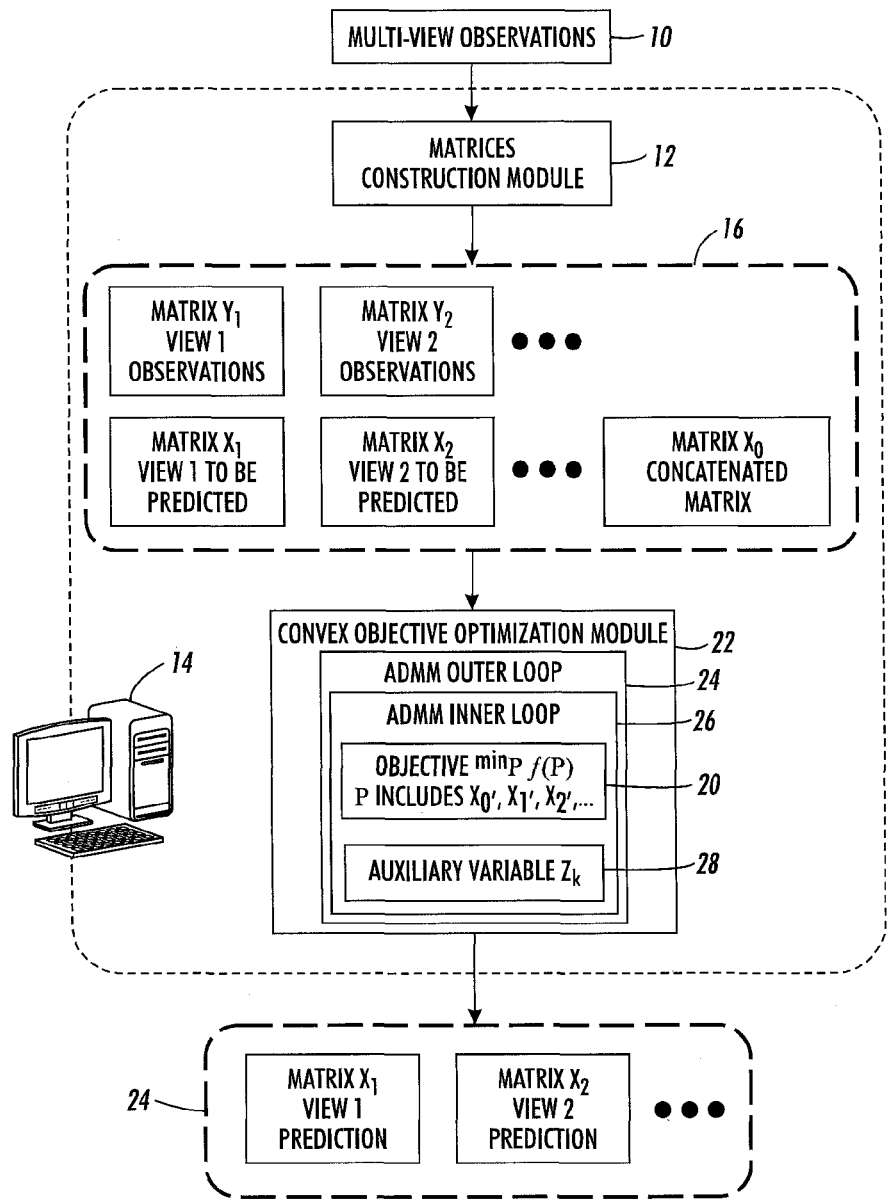
FIG. 1 diagrammatically shows a multi-view learning system.

With reference to FIG. 1, observations 10 are identified by the sets $\Omega_k = \{(i_{kt}, j_{kt})\}$ for $k \in \{1,2\}$. A matrices construction module 12, implemented by a suitably programmed computer 14 in illustrative FIG. 1, constructs the set of matrices 16 on which the disclosed convex formulations of multi-view completion operate. In the illustrative example, these matrices include the incomplete observation matrices $\{Y_k\}_{k=1}^V$ where V is the number of views. In the illustrative examples herein V=2; however, more generally V≥2 for multi-view learning, as indicated by dots ( . . . ) in the diagrammatically indicated set of matrices 16, 24 of FIG. 1.

The observation matrices $\{Y_k\}_{k=1}^V$ are incomplete, which motivates employing multi-view learning to predict missing elements in the observation matrices. In some applications, such as denoising, it may additionally or alternatively be desired to use multi-view learning to generate denoised values for existing observations. In the observation matrices $Y_k$, each element $(i_{kt}, j_{kt})$ represents a pair of (row,column) indices in the k-th view.

The matrices construction module 12 also generates and initializes a set of prediction matrices $\{X_k\}_{k=1}^V$ for multi-view learning of V views, where again V≥2 for multi-view learning and V=2 in the illustrative examples. For V=2, predictions are represented by the latent (prediction) matrices $X_1 := \{x_{1ij}\} \in \mathbb{R}^{d_1 \times n}$ and $X_2 := \{x_{2ij}\} \in \mathbb{R}^{d_2 \times n}$; more generally for the $k^{th}$ view the prediction matrix is $X_k := \{x_{kij}\} \in \mathbb{R}^{d_k \times n}$. The elements of the prediction matrices $\{X_k\}_{k=1}^V$ may be initialized to random values (optionally constrained by known ranges for the various represented view features) or may utilize a priori information where such information is available. For example, in a cross-validation approach, some available observations may be omitted from the observation matrices $Y_k$ and instead used to improve the initialization of the prediction matrices $X_k$.

The matrices construction module 12 also constructs a concatenated matrix, denoted herein as $X_0$, which comprises a concatenation of the prediction matrices $\{X_k\}_{k=1}^V$ for the V views. In the illustrative notation in which the rows of the prediction matrix correspond to features and the columns correspond to objects, the concatenation is suitably a down concatenation in which $X_0 = [X_1; \ldots; X_V] \in \mathbb{R}^{(d_1 + \cdots + d_V) \times n}$ so that the columns correspond to the objects. However, in other notational formalisms, a right concatenation may be suitable.

If the value $y_{kij}$ is not observed, the goal is to predict $y_{kij}$ such that the loss $e_k(x_{kij}; y_{kij})$ is minimized on average. The view-specific losses $e_k: \mathbb{R} \times \mathbb{R} \mapsto \mathbb{R}$ are assumed to be convex in their first argument. Typical examples providing such convexity include the squared loss $e(x,y) = \frac{1}{2}(x-y)^2$ for continuous observations and the logistic loss $e(x,y) = \log(1 + e^{-xy})$ for binary observations, $y \in \{-1,+1\}$. The cumulative training loss associated to view k is defined as $E_k(X_k, Y_k) = \sum_{(i,j) \in \Omega_k} e_k(x_{kij}, y_{kij})$.

Various convex multi-view matrix completion problems are considered herein. These various approaches are labeled I00, I0R, J00, JL0 or JLR. The sequence of three letters composing these labels has the following meaning. The first character (I or J) indicates if the method treats the views independently or jointly. The second character (L or 0) indicates if the method accounts for view-specific variations. "L" in this labeling scheme denotes low-rank as nuclear norm penalties are considered. The third character (R or 0) indicates if the method is robust, where robustness is facilitated by including an $\ell_1$-penalized additional view-specific matrix. The various convex multi-view matrix completion problems considered herein are described below.

The first approach, denoted I00, is a baseline approach that treats the views as being independent, considering a separate nuclear norm penalty for each view. This yields a set of V independent objectives:

$$\min_{X_k} \{\lambda_k \|X_k\|_* + E_k(X_k; Y_k)\}, k = 1, \ldots, V \quad (1)$$

where $\|\cdot\|_*$ denotes the nuclear norm (also known as the trace norm).

A second baseline method (see, e.g. Goldberg et al., "Transduction with matrix completion: Three birds with one stone", in NIPS (2010)), denoted J00, considers a nuclear norm penalty on the concatenated matrix $X_0 = [X_1; X_2] \in \mathbb{R}^{(d_1+d_2) \times n}$. This approach yields the objective:

$$\min_{X_0} \left\{ \lambda_0 \|X_0\|_* + \sum_{k=1}^{V} E_k(P_k X_0; Y_k) \right\} \quad (2)$$

where $P_k$ is a sub-matrix selection operator, so that $P_1 X_0$ is the $d_1 \times n$ matrix composed by the first $d_1$ rows of $X_0$ and $P_2 X_0$ is the $d_2 \times n$ matrix composed by the last $d_2$ rows of $X_0$. In Expression (2) a single regularization parameter $\lambda_0$ is employed, but in some cases it might be beneficial to weight the loss associated to each view differently. For example, in an image labeling application, it might be more important to predict the labels correctly than the features.

Compared to the I00 method, the nuclear norm penalty of the objective given in Expression (2) applies to $X_0$ such that the matrix to complete is the concatenated matrix $Y_0 = [Y_1; Y_2]$ (or, more generally, $Y_0 = [Y_1; \ldots; Y_V]$). This enables information sharing across views, while preserving a view-specific loss to handle different data types.

The baseline approaches I00 and J00 are described for comparative purposes. Disclosed herein are improved multi-view learning approaches comprising convex formulations of multi-view completion, in which the objective includes both view-specific penalties and a cross-view penalty. In general terms, the objective can be written as $\min_{\mathcal{P}} f(\mathcal{P})$ where $\mathcal{P}$ is a set of parameters including at least the prediction matrices $X_1, \ldots, X_V$ and the concatenated matrix $X_0$, and the function $f(\mathcal{P})$ comprises a sum including at least: (1) a loss function for each view comparing the prediction matrix for the view with an incomplete observation matrix for the view; (2) a penalty function for each view computed based on the prediction matrix for the view; and (3) a penalty function computed based on the aggregation of the prediction matrices for the V views. The sum component (2) may be constructed as a penalty function for each view $k = 1, \ldots, V$ comprising a trace norm of the prediction matrix $X_k$ for the view scaled by a regularization parameter. The sum component (3) may be constructed as a trace norm of the concatenated matrix $X_0$ scaled by a regularization parameter. In some such embodiments, function $f(\mathcal{P})$ comprises a sum including at least:

$$\lambda_0 \|X_0\|_* + \sum_{k=1}^{V} \lambda_k \|X_k\|_* + \sum_{k=1}^{V} E_k(X_k + P_k X_0; Y_k) \quad (3)$$

In one such formulation, denoted herein as the JL0 method, each view is decomposed as the sum of a low rank view-specific matrix $X_k$ (the prediction matrix), as in the I00 method, and a sub-matrix $P_k X_0$ of the shared (i.e. concatenated) matrix $X_0$ of size $(d_1+d_2) \times n$ for the case of V=2, as in the J00 method. The resulting objective for the illustrative case of two views (V=2) is:

$$\min_{X_0, X_1, X_2} \lambda_0 \|X_0\|_* + \lambda_1 \|X_1\|_* + \lambda_2 \|X_2\|_* + \sum_{k=1}^{2} E_k(X_k + P_k X_0; Y_k). \quad (4)$$

The objective of Expression (4), or more generally the objective $\min_{\mathcal{P}} f(\mathcal{P})$ with $\mathcal{P} = \{X_0, \ldots, X_V\}$ and $f(\mathcal{P})$ comprising the sum given in Equation (3), is convex jointly in $X_0$, $X_1$ and $X_2$ (or more generally is convex jointly in $X_0$, $X_1, \ldots, X_V$). In these expressions, $E_k$ is a cumulative loss summed over the observations of the observation matrix $Y_k$, $\|\cdot\|_*$ denotes the trace norm, and $\{\lambda_k\}_{k=0}^{V}$ are regularization parameters. As for many nuclear norm penalized problems, for sufficiently large regularization parameters, the matrices $X_1, \ldots, X_V$ and $X_0$ are of low-rank at the minimum of the objective.

A variant formulation denoted herein as the JLR method improves on the JL0 method by enhancing robustness by including an $\ell_1$-penalized additional view-specific matrix. Robustness can be integrated into the JL0 formulation so as to reach the JLR method by adding a sparse matrix $S_k \in \mathbb{R}^{d_k \times n}$ to each latent view representation, leading to the prediction of $Y_k$ by $P_k X_0 + X_k + S_k$. The objective function for JLR in the case of two views (V=2) is defined as follows:

$$\min_{X_0, X_1, X_2, S_1, S_2} \lambda_0 \|X_0\|_* + \lambda_1 \|X_1\|_* + \lambda_2 \|X_2\|_* + \quad (5)$$
$$\alpha_1 \|S_1\|_{1,1} + \alpha_2 \|S_2\|_{1,1} + \sum_{k=1}^{2} E_k(X_k + S_k + P_k X_0; Y_k)$$

where $\|\cdot\|_{1,1}$ is the element-wise $\ell_1$ penalty. The level of sparsity is controlled by view-specific regularization parameters $\alpha_1$ and $\alpha_2$. Extreme observed values $y_{kij}$ will tend to be partly explained by the additional sparse variables $s_{kij}$. Again, the objective is jointly convex in all its arguments. While Expression (5) is appropriate for V=2, the objective for the more general case of V≥2 is can again be written as $\min_{\mathcal{P}} f(\mathcal{P})$, but here with the set of parameters $\mathcal{P}$ including the concatenated matrix $X_0$, the prediction matrices $X_1, \ldots, X_V$, and also including sparse matrices $\{S_k\}_{k=1}^{V}$ and function $f(\mathcal{P})$ comprises a sum including at least:

$$\lambda_0 \|X_0\|_* + \sum_{k=1}^{V} \lambda_k \|X_k\|_* + \sum_{k=1}^{V} \alpha_k \|S_k\|_{1,1} + \sum_{k=1}^{V} E_k(X_k + P_k X_0; Y_k) \quad (6)$$

where again $\|\cdot\|_{1,1}$ denotes the element-wise $\ell_1$ penalty and $\{\alpha_k\}_{k=0}^{V}$ are regularization parameters.

With reference again to FIG. 1, the objective 20 is written in FIG. 1 generically as objective $\min_{\mathcal{P}} f(\mathcal{P})$ where $\mathcal{P}$ includes at least $X_0$ and $X_1, \ldots, X_V$, and may also include $S_1, \ldots, S_V$, and may also include the regularization parameters. A convex objective optimization module 22 (also implemented by the suitably programmed computer 14) optimizes the objective 20 to generate optimized prediction matrices $X_1, \ldots, X_V$ 24. The convex objective optimization module 22 in some embodiments employs an off-the-shelf semi-definite program (SDP) solver such as SDP3 or SeDuMi (see Sturm, "Using sedumi 1.02, a matlab toolbox for optimization over symmetric cones", Optimization methods and software vol. 11(1-4) pp. 625-653 (1999)). However, these solvers are computationally to expensive when dealing with large-scale problems as they use second order information. See Cai et al., "A singular value thresholding algorithm for matrix completion", SIAM Journal on Optimization vol. 20(4), pp. 1956-82 (2010); Toh et al., "An accelerated proximal gradient algorithm for nuclear norm regularized linear least squares problems", Pacific Journal of Optimization 6(615-640):15, 2010. Hence, the illustrative optimization module 22 uses the Alternating Direction Method of Multipliers (ADMM) (see Boyd et al., "Distributed optimization and statistical learning via the alternating direction method of multipliers", Foundations and Trends® in Machine Learning vol. 3(1) pages 1-122 (2011)), which results in a scalable algorithm. In the following, the optimization of the objective of Expression (5) is considered as an illustrative example.

ADMM is a variation of the Augmented Lagrangian method in which the Lagrangian function is augmented by a quadratic penalty term to increase robustness. See Bertsekas, "Constrained optimization and lagrange multiplier methods", Computer Science and Applied Mathematics, Boston: Academic Press 1982, 1, 1982. ADMM ensures the augmented objective remains separable if the original objective was separable by considering a sequence of optimizations with respect to an adequate split of the variables. See Boyd, supra.

In a suitable approach, an auxiliary variable $Z_k$ is introduced such that it is constrained to be equal to $X_k + S_k + P_k X_0$. The augmented Lagrangian of this problem can be written as:

$$\mathcal{L}(X_0, \{X_k, S_k, Z_k, B_k\}_{k=1}^2, \mu) = \lambda_0 \|X_0\|_* + \lambda_1 \|X_1\|_* + \quad (7)$$

$$\lambda_2 \|X_2\|_* + \alpha_1 \|S_1\|_{1,1} + \alpha_2 \|S_2\|_{1,1} + \sum_{k=1}^2 E_k(Z_k; Y_k) -$$

$$\sum_{k=1}^2 tr(B_k^T (X_k + S_k + P_k X_0 - Z_k)) + \frac{\mu}{2} \sum_{k=1}^2 \|X_k + S_k + P_k X_0 - Z_k\|_{2,2}^2$$

where $\|\cdot\|_{2,2}$ is the element-wise $\ell_2$ norm (or Frobenius norm). Parameters $B_k$ and $\mu > 0$ are respectively the Lagrange multiplier and the quadratic penalty parameter.

With continuing reference to FIG. 1 and with further reference to Algorithms 1 and 2, the ADMM algorithm for optimizing the objective of Expression (5) is set forth in Algorithms 1 and 2, where Algorithm 1 is diagrammatically indicated by an outer loop 24 in FIG. 1 and Algorithm 2 presents the inner loop 26 of the ADMM algorithm corresponding to the function $\text{ADMM}_{inner\ loop}$ of Algorithm 1. The Lagrangian 28 of Expression (7) is also diagrammatically indicated in FIG. 1. The minimization of the Lagrangian of Expression (7) with respect to $X_0$, $X_1$, and $X_2$ is a soft-thresholding operator on their singular values. It is defined as $\mathcal{D}_\beta(X) = U(\Sigma - \beta I)_+ V^T$ for $X = U\Sigma V^T$ and $\beta \geq 0$. Similarly, the minimization of the Lagrangian of Expression (7) with respect to $S_1$ and $S_2$ is a soft-thresholding operator applied element-wise. It is defined as $\mathcal{S}_\alpha(x) = \text{sgn}(x)\max(|x|-\alpha, 0)$.

Algorithm 1: ADMM for Convex Multi-View Learning

Initialize $W^0 = \{X_0^0, \{X_k^0, S_k^0, Z_k^0\}_{k=1}^2\}$
Initialize $B^0 = \{B_1^0, B_2^0\}$, $\mu^0 > 0$ and $\rho > 1$
for t = 1 to T do
   $W^t = \text{ADMM}_{inner\ loop}(W^{t-1}, B^{t-1}, \mu^{t-1})$
   for k = 1 to 2 do
     $B_k^t = B_k^{t-1} - \mu^{t-1}(X_k^t + S_k^t + P_k X_0^t - Z_k^t)$
   end for
   $\mu^t = \mu^{t-1}\rho$
end for Algorithm 2: ADMM Inner Loop for m = 1 to M do
$$X_0^{m+1} = \mathcal{D}_{\frac{\lambda_0}{\mu^{t-1}}}\left(\left[Z_1^m + \frac{B_1^{t-1}}{\mu^{t-1}}; Z_2^m + \frac{B_2^{t-1}}{\mu^{t-1}}\right] - [X_1^m + S_1^m, X_2^m + S_2^m]\right)$$
   for k = 1 to 2 do
$$X_k^{m+1} = \mathcal{D}_{\frac{\lambda_k}{\mu^{t-1}}}\left(Z_k^m + \frac{B_k^{t-1}}{\mu^{t-1}} - P_k X_0^{m+1} - S_k^m\right)$$

$$S_k^{m+1} = \mathcal{S}_{\frac{\alpha_k}{\mu^{t-1}}}\left(Z_k^m + \frac{B_k^{t-1}}{\mu^{t-1}} - P_k X_0^{m+1} - X_k^{m+1}\right)$$

$B_k^t = B_k^{t-1} - \mu^{t-1}(X_k^t + S_k^t + P_k X_0^t - Z_k^t)$
$W = \{X_0^{m+1}, \{X_k^{m+1}, S_k^{m+1}, Z_k^{m+1}\}_{k=1}^2\} \setminus \{Z_k^{m+1}\}$
$Z_k^{m+1} = \arg\min_{Z_k} \mathcal{L}(W, Z_k, B^{t-1}, \mu^{t-1})$
   end for
end for Depending on the type of loss, the optimization of the augmented Lagrangian with respect to $Z_k$ is different. In the following, specialization of the ADMM algorithm for the squared and logistic loss functions, respectively, is described as illustrative examples, and these can be readily generalized to any convex differentiable loss.

In the squared loss case, the minimization of the augmented Lagrangian with respect to $Z_k$ has a closed-form solution:

$$Z_k^* = \left(1_k - \frac{\mathcal{P}_{\Omega_k}(1_k)}{\mu}\right) \times \left(X_k + S_k + P_k X_0 - \frac{B_k}{\mu} + \frac{\mathcal{P}_{\Omega_k}(Y_k)}{\mu}\right) \quad (8)$$

where $1_k$ is a matrix of ones and the projection operator $\mathcal{P}_\Omega: \mathbb{R}^{d \times n} \mapsto \mathbb{R}^{d \times n}$ selects the entries in $\Omega$ and sets the others entries to 0.

In the case of the logistic loss, the minimization of the augmented Lagrangian of Expression (7) with respect to $Z_k$ has no analytical solution. However, around a fixed $\bar{Z}_k$, the logistic loss can be upper-bounded by a quadratic function:

$$\sum_{i,j \in \Omega_k} \log(1 + \exp(-(x_{0ij} + x_{kij} + s_{kij})y_{kij})) \leq \quad (9)$$

$$\frac{\tau}{2} \|\mathcal{P}_{\Omega_k}((X_k + S_k + P_k X_0) - \mathcal{P}_{\Omega_k}(\bar{Y}_k))\|_2^2$$

where:

$$\bar{y}_{2ij} = \bar{z}_{kij} - \frac{1}{\tau} \frac{-y_{2ij}}{1 + \exp(y_{2ij}\bar{z}_{kij})} \quad (10)$$

and $\tau$ is the Lipschitz continuity of the logistic function. This leads to the following solution:

$$Z_k^* = \left(1_k - \frac{\mathcal{P}_{\Omega_k}(1_k)}{\mu}\right)\left(X_k + S_k + P_k X_0 - \frac{B_k}{\mu} + \frac{\mathcal{P}_{\Omega_k}(Y_k)}{\mu}\right) \quad (11)$$

Parameter $1/\tau$ plays the role of a step size. See Toh et al., supra. In practice, it can be increased as long as the bound inequality holds. A line search is then used to find a smaller value for $\tau$ satisfying the inequality.

With continuing reference to FIG. 1, the output of the ADMM algorithm (or other objective optimization algorithm) is the set of optimized prediction matrices $\{X_k\}_{k=1}^V$ diagrammatically indicated by block 24 in FIG. 1. For a prediction task, a prediction for view k of an object is generated based on the optimized prediction matrix $X_k$. For example, using the illustrative notation including the matrix row and column designations of the illustrative examples herein, the optimized prediction matrices are $\{X_k:=\{x_{kij}\}\in \mathbb{R}^{d_k \times n}\}_{k=1}^V$ for the V views, where index $i=1, \ldots, n$ indexes objects and $j=1, \ldots, d_k$ indexes the features for view k. Here, a prediction for a view k of an object i is suitably generated based on the $i^{th}$ column of the optimized prediction matrix $X_k$. A prediction may be for an object/view element that are not observed (that is, are not included in the observation matrices $\{Y_k\}_{k=1}^V$), in which case the output is a true prediction of an unknown value. Alternatively, the prediction may be for an object/view element that is observed (i.e., is included in the observation matrices $\{Y_k\}_{k=1}^V$), in which case the output can be viewed as a denoised value.

With reference again to FIG. 1, the modules 12, 22 are suitably implemented by the illustrative computer 14 or other suitably programmed or configured electronic data processing device. Although not explicitly shown in FIG. 1, the computer 14 or other electronic data processing device is also suitably programmed or configured to perform prediction operations, e.g. by reading the predicted feature values for a view k of an object i from the $i^{th}$ column of the optimized prediction matrix $X_k$ in the illustrative examples. It will be appreciated that the computer 14 or other electronic data processing device may optionally be embodied as a plurality of computers, for example an ad hoc combination of computers defining a "cloud" computing system.

It will further be appreciated that the disclosed multi-view learning techniques may be embodied as a non-transitory storage medium storing instructions readable and executable by the computer 14 or other electronic data processing device to perform the disclosed multi-view learning techniques. The non-transitory storage medium may, for example, comprise one or more of: a hard drive or other magnetic storage medium; a flash drive or other electronic storage medium; an optical disk or other optical storage medium; various combinations thereof; or so forth.

In the following, experimental tests are described, which were performed to assess performance of the JL0 method (using the objective of Expression (4)) and the JLR method (using the objective of Expression (5)). For comparison, the baseline J00 method using the objective of Expression (2) with V=2 was also tested. For further comparison, I0R and J0R methods were also tested. The I0R method corresponds to the baseline I00 approach using the set of V independent objectives given in Expression (1) with V=2, with the sparse matrices $S_1$ and $S_2$ added to facilitate robustness analogously to the described JLR approach. The J0R method corresponds to the baseline J00 approach using the objective of Expression (2) with V=2, with the sparse matrices $S_1$ and $S_2$ added to facilitate robustness analogously to the described JLR approach. The experimental tests were performed on synthetic data for an experimental matrix completion task, and on real-world data for experimental image denoising and multi-label classification tasks. In the following, the parameter tuning and evaluation criteria used in the experiments are described, followed by discussion of the results.

Parameter tuning (that is, optimizing the regularization parameters $\lambda_0$, $\lambda_1$, and $\lambda_2$ of the objective function) was performed separately from the ADMM algorithm, using a grid approach. That is, the parameter tuning component of optimizing the objective $\min_{\mathcal{P}} f(\mathcal{P})$ respective to the set of parameters $\mathcal{P}$ including regularization parameters $\{\lambda_k\}_{k=0}^{V=2}$ was performed using a grid optimization. In the experiments, five-fold cross-validation on a grid was employed to obtain the optimum values for the regularization parameters. However, to simplify the optimization, a slightly different formulation of the models was considered. For example, for the JLR method the objective was optimized with respect to $\lambda$ and c where $0<c<1$ instead of respective to $\lambda_0$, $\lambda_1$, $\lambda_2$. The resulting objective function is of the form:

$$\lambda\left(\frac{1}{1-c}\|X_0\|_* + \frac{1}{c}\|X_1\|_* + \frac{1}{c}\|X_2\|_*\right) \quad (12)$$

To evaluate the performance on matrix completion, normalized prediction test error (called "test error" herein) was used. One part of the data was used as training data, and the optimized prediction matrices $X_k$ generated by this training were tested on the remaining part of the data and the prediction error reported. For multi-label classification performance, the transductive label error (i.e., the percentage of incorrectly predicted labels) and the relative feature reconstruction error were used. See Goldberg et al., "Transduction with matrix completion: Three birds with one stone", in NIPS (2010).

Results for comparison the prediction capabilities of the JLR, JL0, J0R, J00, and I00 on synthetic datasets are as follows. Randomly generated square matrices of size n were used in these experiments. Matrices $X_0$, $X_1$, and $X_2$ were generated with different rank ($r_0$, $r_1$, and $r_2$) as a product of $UV^T$ where U and V are generated randomly with Gaussian distribution and unitary noise. Noise matrices $E_1$ and $E_2$ were generated randomly with Gaussian distribution and unitary noise. Sparse matrices $S_1$ and $S_2$ were generated by choosing a sparse support set of size $k=0.1*n^2$ uniformly at random, and whose non-zero entries were generated uniformly in a range $[-a, a]$. For each setting, 10 trials were repeated and the mean and standard deviation of the test error reported.

Tables 1 and 2 show the comparison of the JLR, JL0, J0R, J00, and I00 methods for two different settings. Table 1 shows test error performance for the synthetic datasets where n=2000 and $d_1=d_2=1000$. Table 2 shows test error performance for the synthetic datasets where n=200 and $d_1=d_2=100$. In Tables 1 and 2, each cell shows the mean and standard deviation of the test error over 10 simulations. The test prediction performances of JLR is seen to be superior compared to the other approaches. It is also seen that the training loss is lower in JLR approach. Note that the stopping criteria for these tests was a fixed number of iterations, and the times in the CPU time column do not include the cross-validatoin time.

TABLE 1

| Method | Test error | Training loss | CPU time |
| --- | --- | --- | --- |
| JLR | 83.61 ± 4.19 | 79.29 ± 2.08 | 172.24 ± 1.92 |
| JL0 | 89.52 ± 3.97 | 81.59 ± 2.14 | 149.14 ± 1.19 |
| J0R | 94.51 ± 4.02 | 85.37 ± 2.49 | 89.54 ± 2.01 |
| J00 | 138.31 ± 3.92 | 92.47 ± 2.84 | 45.34 ± 1.21 |
| I0R | 131.43 ± 3.16 | 86.37 ± 2.59 | 41.26 ± 1.32 |
| I00 | 142.57 ± 3.25 | 98.61 ± 3.31 | 46.82 ± 1.52 |

TABLE 2

| Method | Test error | Training loss | CPU time |
| --- | --- | --- | --- |
| JLR | 53.23 ± 2.25 | 27.43 ± 0.12 | 3.96 ± 0.19 |
| JL0 | 59.45 ± 2.74 | 28.73 ± 0.15 | 2.71 ± 0.14 |
| J0R | 63.56 ± 2.17 | 29.76 ± 0.22 | 1.08 ± 0.21 |
| J00 | 72.39 ± 2.32 | 45.37 ± 0.31 | 1.03 ± 0.29 |
| I0R | 69.25 ± 2.13 | 41.52 ± 0.23 | 1.02 ± 0.36 |
| I00 | 76.41 ± 2.57 | 48.36 ± 0.27 | 1.01 ± 0.31 |

Image denoising test results are next presented. The performance of JLR for image denoising was evaluated and compared against J0R and I0R. The image denoising is based on the Extended Yale Face Database B available at cvc.yale.edu/projects/yalefacesB.html. This database contains image faces from 28 individuals under 9 different poses and 64 different lighting conditions. Two different lighting conditions (+000E+00 and +000E+20) were defined as two views of a face. The intuition is that each view has low rank latent structure (due to the view-specific lightning condition), while each image shares the same global structure (the same person with the same pose). Each image was downsampled to 100×100. So the dimension of the datasets based on the notation used herein is: $d_1$=10000, and $d_2$=10000.

Noise in the amount of 5% was added to randomly selected pixels of view 1 and view 2 as well as to missing entries in both views. The goal was to reconstruct the image by filling in missing entries as well as removing the noise.

Results are presented in Table 3, which tabulates the average test error (squared error) over five random train-test splits for the Yale Face Dataset processed as just described. The standard deviation was less than $10^{-3}$ in all cases. It was found that the J0R method was successful in removing the noise, but the quality of the reconstruction was visually inferior to the JLR method which effectively captured the specific low-rank variations of each image. The visual intuition was confirmed by the fact that the best performances were obtained by JLR and JL0. Quantitatively, JLR only slightly outperforms JL0, but there was substantial visual qualitative improvement.

TABLE 3

|  | JLR | JL0 | J0R | J00 | I0R | I00 |
| --- | --- | --- | --- | --- | --- | --- |
| Test error | 0.0619 | 0.0621 | 0.0631 | 0.1002 | 0.0825 | 0.1012 |

The multi-label classification experiments are next presented. These experiments evaluated the applicability of the JLR method with a logistic loss on the second view in the context of a multi-label prediction task and compared it with the approach of Goldberg et al., "Transduction with matrix completion: Three birds with one stone", in NIPS (2010). In this task, View 1 represents the feature matrix and View 2 the label matrix. In many practical situations, the feature matrix is partially observed. One way to address this is to first impute the missing data in the feature matrix and then further proceed with the multi-label classification task. Another way is to treat the feature matrix and the label matrix as two views of the same object, and treating the labels to be predicted as missing entries. For comparison, the J00 method using the approach of Goldberg et al., supra and using ADMM were tested, along with the J0R, JL0, and JLR methods. Two different datasets were considered, both of which were also used in Goldberg et al., supra, namely: Yeast Micro-array data and Music Emotion data available at: mulan.sourceforge.net/datasets.html.

The Yeast dataset contains n=2417 samples in $d_1$=103 dimensional space. Each sample can belong to one of $d_2$=14 gene functional classes, and the goal was to classify each gene based on its function. In the experiments, the percentage of observed value was varied between 40%, 60%, and 80% (denoted herein as $\pi$=40%, $\pi$=60%, and $\pi$=80%). Parameters were tuned by cross validation on optimizing the label error prediction. For each $\pi$, 10 repetitions were performed, and the mean and standard deviation (in parenthesis) are reported in Table 4, where the first data row labeled "J00 (1)" is from Goldberg et al., supra, and the second data row labeled "J00 (2)" solves the same problem using the ADMM algorithm disclosed herein.

TABLE 4

|  | Label error percentage | | | Relative feature recon error | | |
| --- | --- | --- | --- | --- | --- | --- |
|  | $\pi$ = 40% | $\pi$ = 60% | $\pi$ = 80% | $\pi$ = 40% | $\pi$ = 60% | $\pi$ = 80% |
| J00 (1) | 16.7 (0.3) | 13.0 (0.2) | 8.5 (0.4) | 0.86 (0.02) | 92 (0.00) | 0.74 (0.02) |
| J00 (2) | 16.8 (0.4) | 13.1 (0.2) | 8.4 (0.3) | 0.83 (0.01) | 89 (0.01) | 0.71 (0.01) |
| J0R | 16.4 (0.2) | 12.9 (0.1) | 8.1 (0.2) | 0.81 (0.01) | 86 (0.01) | 0.69 (0.01) |
| JL0 | 16.8 (0.2) | 13.0 (0.1) | 8.4 (0.3) | 0.82 (0.01) | 85 (0.01) | 0.70 (0.01) |
| JLR | 16.4 (0.2) | 12.8 (0.1) | 8.1 (0.2) | 0.80 (0.01) | 82 (0.01) | 0.67 (0.01) |

The left columns of Table 4 show the label prediction error on the Yeast dataset. It is seen that J00 using Goldberg et al. and the ADMM algorithm produce very similar results. A slightly lower label prediction error is obtained for J0R and JLR. The right columns in Table 4 show the relative feature reconstruction error. JLR outperforms the other algorithms in relative feature reconstruction error. This is believed to be due to JLR being a richer model that is better able to capture the underlying structure of the data.

The Music dataset consists of n=593 songs in $d_1$=72 dimension (i.e., 8 rhythmic and 64 timbre-based) each one labeled with one or more of $d_2$=6 emotions (amazed-surprised, happy-pleased, relaxing-calm, quiet-still, sad-lonely, and angry-fearful). Features were automatically extracted from a 30-second audio clip. Table 5 presents the results for the same methods as were tested against the Yeast datasaet, using the same table format and notation as Table 4.

TABLE 5

| | Label error percentage | | | Relative feature recon error | | |
|---|---|---|---|---|---|---|
| | $\pi = 40\%$ | $\pi = 60\%$ | $\pi = 80\%$ | $\pi = 40\%$ | $\pi = 60\%$ | $\pi = 80\%$ |
| J00 (1) | 27.4 (0.8) | 23.7 (1.6) | 19.8 (2.4) | 0.60 (0.05) | 0.46 (0.12) | 0.25 (0.03) |
| J00 (2) | 28.0 (0.01) | 24.1 (0.02) | 21.2 (0.01) | 0.58 (0.01) | 0.33 (0.02) | 0.12 (0.01) |
| J0R | 28.0 (0.01) | 24.1 (0.02) | 21.2 (0.01) | 0.58 (0.01) | 0.33 (0.02) | 0.12 (0.01) |
| JL0 | 27.8 (0.02) | 23.0 (0.05) | 20.7 (0.06) | 0.56 (0.02) | 0.30 (0.01) | 0.10 (0.01) |
| JLR | 27.8 (0.02) | 3.0 (0.05) | 20.7 (0.06) | 0.56 (0.02) | 0.30 (0.01) | 0.10 (0.01) |

For the label error percentage, and similar to the results for the Yeast dataset, the results for the Music dataset show that J00 performed using the method of Goldberg et al., supra and using ADMM have similar label error performance. In the Music dataset, it is seen that JLR and JL0 produce similar results which suggests that the low-rank structure defined on the label matrix is sufficient to improve the prediction performance. The right columns of Table 5 again show the relative feature reconstruction error. Here it may be noted that J00 performed using the ADMM algorithm has better results in relative feature reconstruction error as compared to J00 performed using the method of Goldberg et al., supra. This suggest the efficiency of ADMM implemented for J00. Second, it is seen that JLR outperforms the other algorithms in terms of relative feature reconstruction error.

Figure 2:
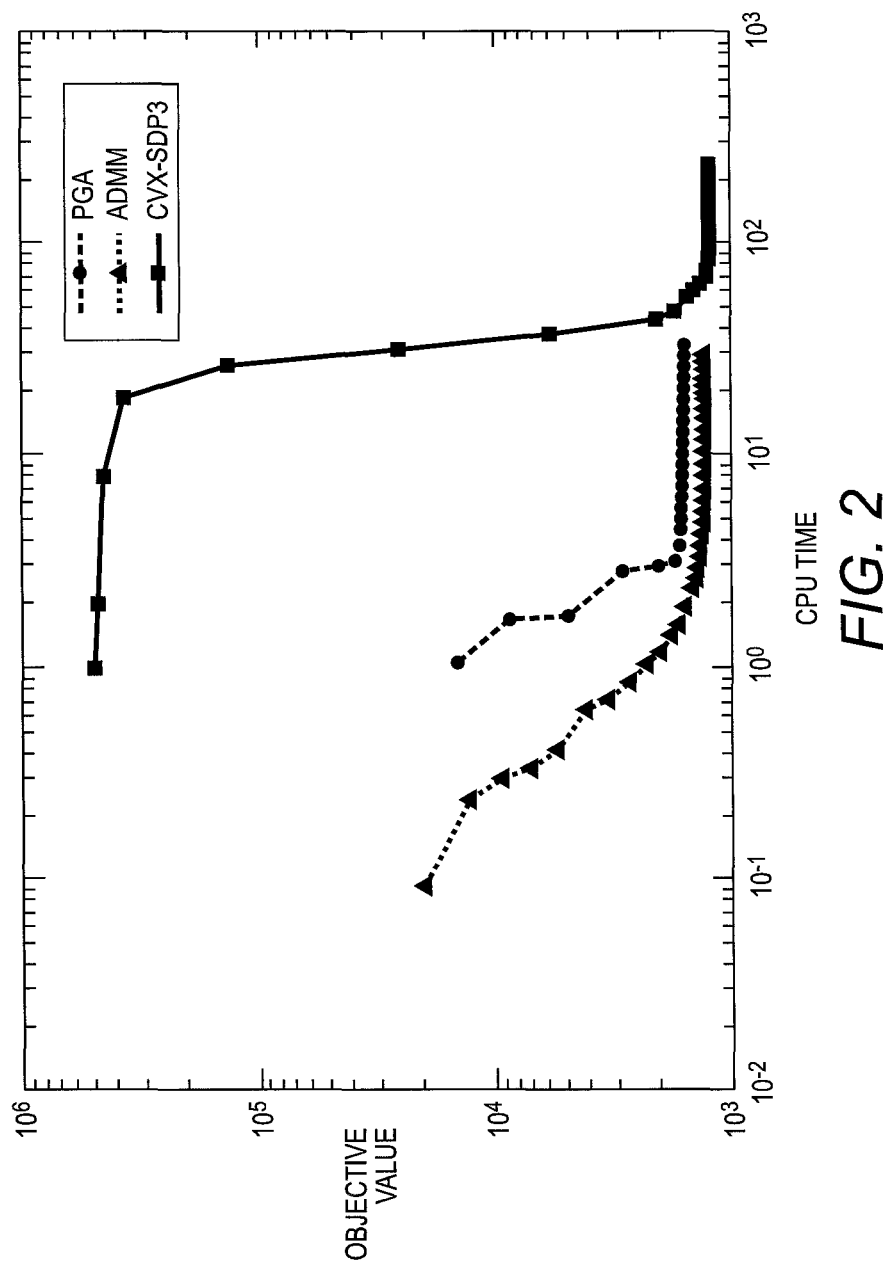
FIG. 2 plots experimental results as described herein.

With reference to FIG. 2, the ADMM algorithm for JLR is compared with off-the-shelf SDP solvers (using CVX with SDP3, curve labeled "CVX-SDP3" in FIG. 2) and to the accelerated proximal gradient (PGA) described in Toh et al., "An accelerated proximal gradient algorithm for nuclear norm regularized linear least squares problems", Pacific Journal of Optimization 6(615-640):15, 2010. FIG. 2 plots objective value versus CPU runtime. Synthetically generated data with n=100 was considered. The CPU time was computed using a built-in function, cputime, which is available in MATLAB. All algorithms were executed on a standard desktop computer with 2:5 GHz CPU (dual core) and 4 GB of memory. It is seen in FIG. 2 that ADMM is converging faster to the optimum value (the one found by CVX with duality gap<$10^{-8}$) in a shorter time compared to CVX-SDP3 and PGA. This illustrates that, under general conditions when $\{\mu_k\}$ is an increasing unbounded sequence, and the objective function and constraints are both differentiable, ADMM converges to the optimum solution super Q-linearly in similar fashion to Augmented Lagrangian Method (see Bertsekas, "Constrained optimization and lagrange multiplier methods", Computer Science and Applied Mathematics, Boston: Academic Press 1982, 1, 1982). An additional advantage of ADMM is that the optimal step size is just the penalty term $\mu_k$ which makes the algorithm free of tuning parameters, unlike an iterative thresholding algorithm; PGA and other thresholding algorithms are only sub-linear in theory. See Lin et al., "The augmented lagrange multiplier method for exact recovery of corrupted low-rank matrices", Technical report, UIUC, 2009.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A non-transitory storage medium storing instructions readable and executable by a computer to perform a method for generating predictions by operations including:

determining optimized prediction matrices $\{X_k\}_{k=1}^{V}$ for multi-view learning of V views where $V \geq 2$ by optimizing an objective $\min_{\mathcal{P}} f(\mathcal{P})$ wherein $\mathcal{P}$ is a set of parameters including at least the prediction matrices $X_1, \ldots, X_V$ and a matrix $X_0$ comprising a concatenation of the prediction matrices $X_1, \ldots, X_V$, and function $f(\mathcal{P})$ comprises a sum including at least:

$$\lambda_0 \|X_0\|_* + \sum_{k=1}^{V} \lambda_k \|X_k\|_* + \sum_{k=1}^{V} E_k(X_k + P_k X_0; Y_k)$$

where $\{Y_k\}_{k=1}^{V}$ are incomplete observation matrices for the V views, $P_k X_0$ denotes the sub-matrix of $X_0$ corresponding to prediction matrix $X_k$, $E_k$ is a cumulative loss summed over the observations of the observation matrix $Y_k$, $\|\cdot\|_*$ denotes the trace norm, and $\{\lambda_k\}_{k=0}^{V}$ are regularization parameters; and generating a prediction for view k of an object based on the optimized prediction matrix $X_k$.

2. The non-transitory storage medium of claim 1 wherein:

$\{X_k := \{x_{kij}\} \in \mathbb{R}^{d_k \times n}\}_{k=1}^{V}$ for the V views, where index $i=1, \ldots, n$ indexes objects and $j=1, \ldots, d_k$ indexes the features for view k, $\{Y_k := \{Y_{kij}\} \in \mathbb{R}^{d_k \times n}\}_{k=1}^{V}$ are the incomplete observation matrices for the V views, $X_0 = [X_1; \ldots; X_V] \in \mathbb{R}^{(d_1 + \cdots + d_V) \times n}$ is the down concatenation of prediction matrices $X_1, \ldots, X_V$, and the generating comprises generating a prediction for a view k of an object i based on the $i^{th}$ column of the optimized prediction matrix $X_k$.

3. The non-transitory storage medium of claim 1 wherein the set of parameters $\mathcal{P}$ further includes regularization parameters $\{\lambda_k\}_{k=0}^{V}$.

4. The non-transitory storage medium of claim 3 wherein the optimizing of the objective $\min_{\mathcal{P}} f(\mathcal{P})$ comprises tuning the regularization parameters $\{\lambda_k\}_{k=0}^{V}$ using a grid optimization.

5. The non-transitory storage medium of claim 1 wherein the set of parameters $\mathcal{P}$ further includes sparse matrices $\{S_k\}_{k=1}^{V}$ and the function $f(\mathcal{P})$ comprises a sum including at least:

$$\lambda_0 \|X_0\|_* + \sum_{k=1}^{V} \lambda_k \|X_k\|_* + \sum_{k=1}^{V} \alpha_k \|S_k\|_{1,1} + \sum_{k=1}^{V} E_k(X_k + P_k X_0; Y_k)$$

where $\|\cdot\|_{1,1}$ denotes the element-wise $\ell_1$ penalty and $\{\alpha_k\}_{k=0}^{V}$ are regularization parameters.

6. The non-transitory storage medium of claim 1 wherein the determining comprises optimizing the objective $\min_{\mathcal{P}} f(\mathcal{P})$ using Alternating Direction Method of Multipliers (ADMM).

7. The non-transitory storage medium of claim 1 wherein the determining comprises optimizing the objective $\min_{\mathcal{P}} f(\mathcal{P})$ using an Augmented Lagrangian method in which the Lagrangian function is augmented by a quadratic penalty.

8. An apparatus comprising:
a non-transitory storage medium as set forth in claim 1; and
a computer configured to read and execute instructions stored on the non-transitory storage medium to generate a prediction for a view k of an object i.

9. A method comprising:
determining optimized prediction matrices for multi-view learning of V views where V≥2 by optimizing an objective $\min_{\mathcal{P}} f(\mathcal{P})$ wherein $\mathcal{P}$ is a set of parameters including at least the prediction matrices for the V views and for a set of objects and an aggregation of the prediction matrices for the V views, and function $f(\mathcal{P})$ comprises a sum including at least:
(1) a loss function for each view comparing the prediction matrix for the view with an incomplete observation matrix for the view and
(2) a penalty function for each view computed based on the prediction matrix for the view and
(3) a penalty function computed based on the aggregation of the prediction matrices for the V views; and
generating a prediction of a view of an object based on the optimized prediction matrix for that view;
wherein the determining and generating operations are performed by an electronic data processing device.

10. The method of claim 9 wherein the function $f(\mathcal{P})$ comprises a sum including at least:
(1) a loss function for each view comparing the prediction matrix for the view with an incomplete observation matrix for the view and
(2) a penalty function for each view comprising a trace norm of the prediction matrix for the view scaled by a regularization parameter and
(3) a penalty function computed based on the aggregation of the prediction matrices for the V views.

11. The method of claim 9 wherein the function $f(\mathcal{P})$ comprises a sum including at least:
(1) a loss function for each view comparing the prediction matrix for the view with an incomplete observation matrix for the view and
(2) a penalty function for each view computed based on the prediction matrix for the view and
(3) a penalty function comprising a trace norm of a concatenation of the prediction matrices for the V views scaled by a regularization parameter.

12. The method of claim 9 wherein the function $f(\mathcal{P})$ comprises a sum including at least:
(1) a loss function for each view comparing the prediction matrix for the view with an incomplete observation matrix for the view and
(2) a penalty function for each view comprising a trace norm of the prediction matrix for the view scaled by a regularization parameter and
(3) a penalty function comprising a trace norm of a concatenation of the prediction matrices for the V views scaled by a regularization parameter.

13. The method of claim 12 wherein the set of parameters $\mathcal{P}$ further includes a sparse matrix for each view and the function $f(\mathcal{P})$ comprises a sum including at least:
(1) a loss function for each view comparing the prediction matrix for the view with an incomplete observation matrix for the view and
(2) a penalty function for each view comprising a trace norm of the prediction matrix for the view scaled by a regularization parameter and
(3) a penalty function for an aggregation of the views comprising a trace norm of a concatenation of the prediction matrices for the V views scaled by a regularization parameter and
(4) an element-wise $\ell_1$ norm of the sparse matrix for each view.

14. The method of claim 9 wherein the determining comprises optimizing the objective $\min_{\mathcal{P}} f(\mathcal{P})$ using Alternating Direction Method of Multipliers (ADMM).

15. The method of claim 9 wherein the determining comprises optimizing the objective $\min_{\mathcal{P}} f(\mathcal{P})$ using an Augmented Lagrangian method in which the Lagrangian function is augmented by a quadratic penalty.

16. An apparatus comprising:
an electronic data processing device configured to perform a method including:
determining optimized prediction matrices for V views of n objects where V≥2 by optimizing an objective
$\min_{\mathcal{P}} f(\mathcal{P})$ wherein $\mathcal{P}$ is a set of parameters including at least the prediction matrices for the V views and a concatenated matrix comprising a concatenation of the prediction matrices for the V views, and function $f(\mathcal{P})$ comprises a sum including at least:
(1) a loss function for each view comparing the prediction matrix for the view with an incomplete observation matrix for the view and
(2) a trace norm of the prediction matrix for each view and
(3) a trace norm of the concatenated matrix; and
generating a prediction of a view of an object based on the optimized prediction matrix for that view.

17. The apparatus of claim 16 wherein the set of parameters $\mathcal{P}$ further includes a sparse matrix for each view and the function $f(\mathcal{P})$ comprises said sum further including:
(4) an element-wise $\ell_1$ norm of the sparse matrix for each view.

18. The apparatus of claim 16 wherein the determining comprises optimizing the objective $\min_{\mathcal{P}} f(\mathcal{P})$ using Alternating Direction Method of Multipliers (ADMM).

19. The apparatus of claim 16 wherein the determining comprises optimizing the objective $\min_{\mathcal{P}} f(\mathcal{P})$ using an Augmented Lagrangian method in which the Lagrangian function is augmented by a quadratic penalty.

20. The apparatus of claim 16 wherein the set of parameters $\mathcal{P}$ further includes regularization parameters scaling the trace norms of the prediction matrices for the V views and a regularization parameter scaling the trace norm of the concatenated matrix.

\* \* \* \* \*